A. W. MANSBRIDGE.
ELECTRICAL HEATER.
APPLICATION FILED MAR. 3, 1915.
1,155,593.
Patented Oct. 5, 1915.
2 SHEETS—SHEET 1.
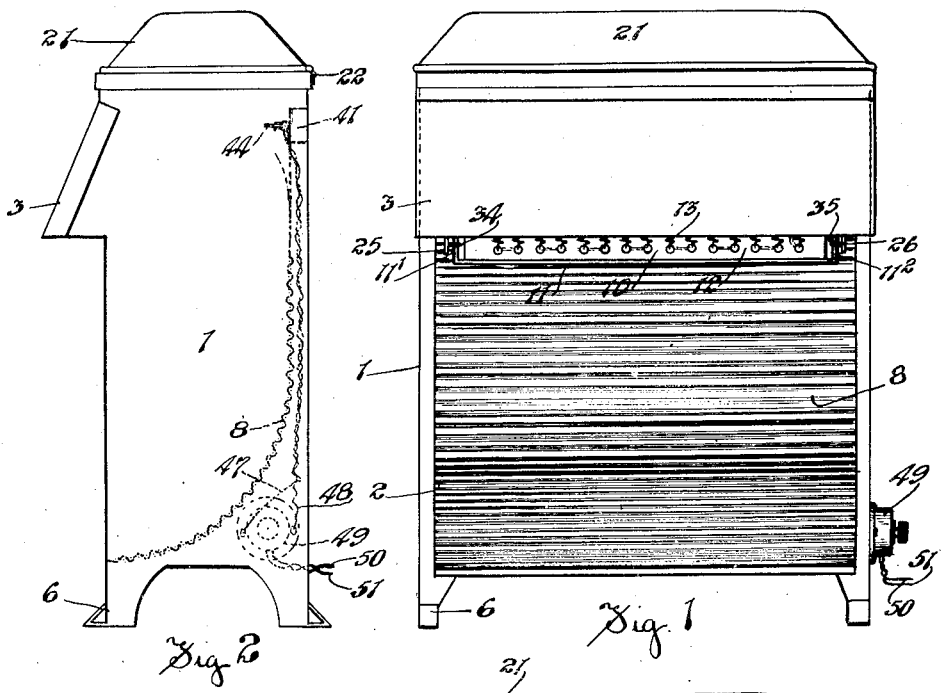
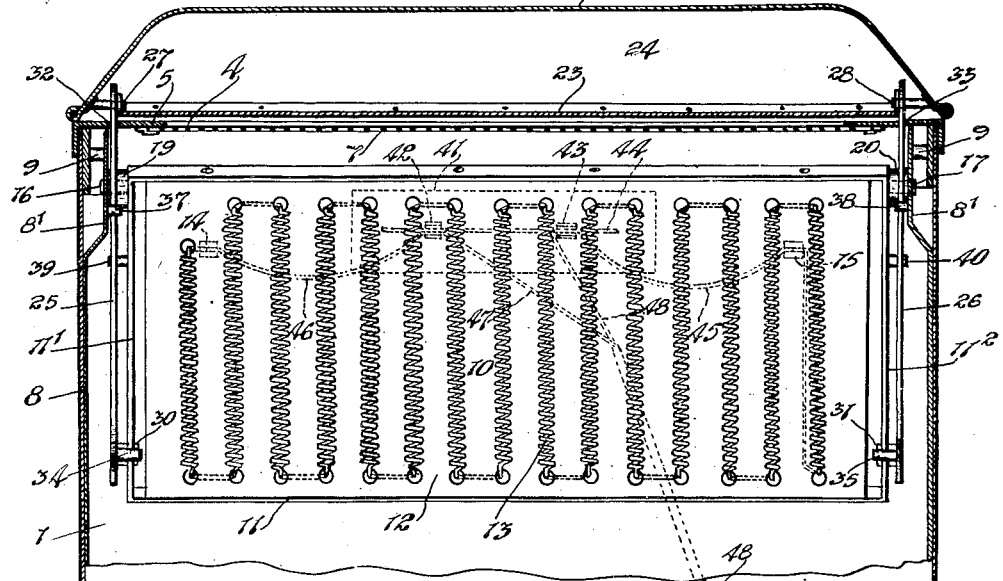

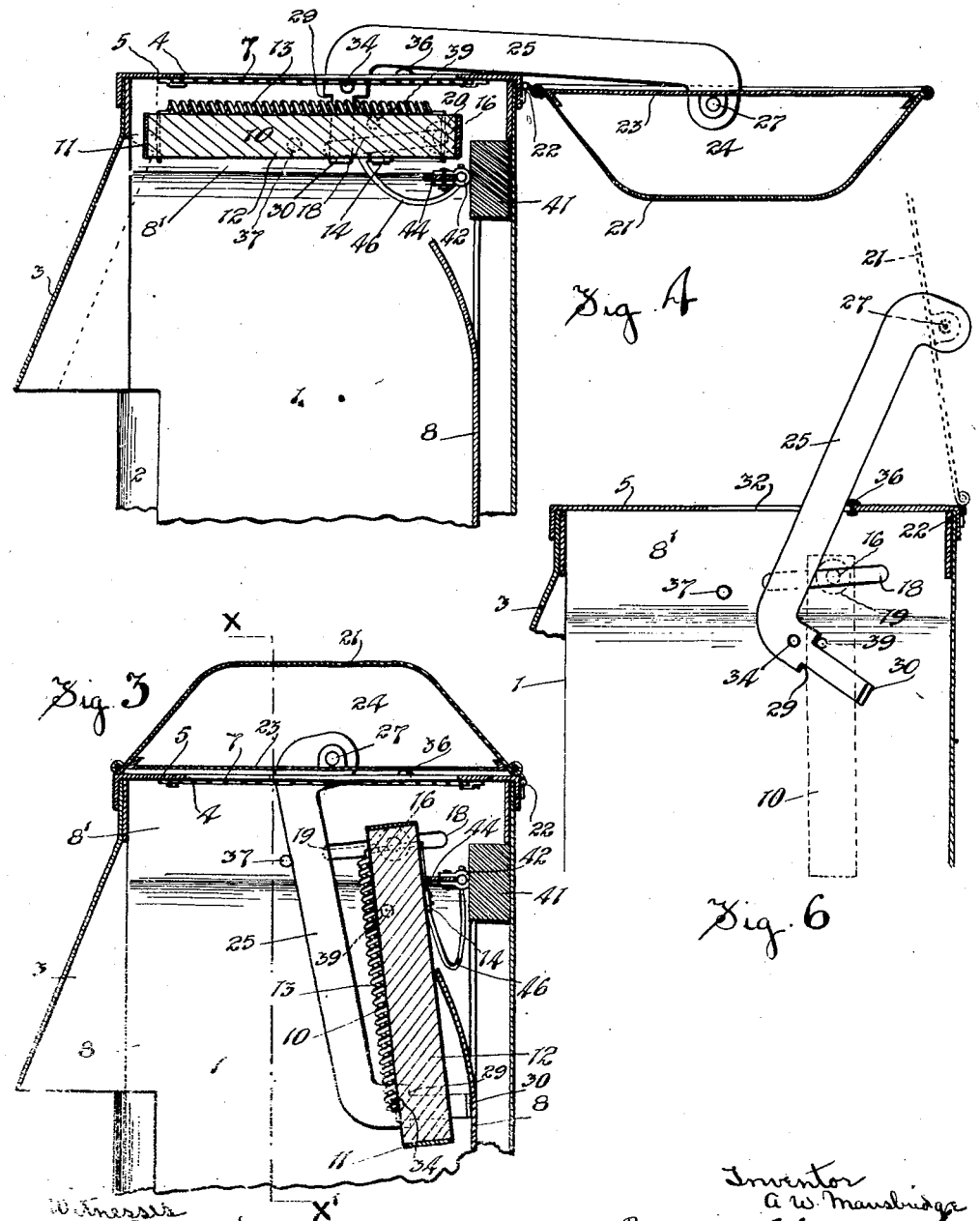

UNITED STATES PATENT OFFICE.

ARNOLD WILLIAM MANSBRIDGE, OF WINNIPEG, MANITOBA, CANADA.

ELECTRICAL HEATER.

1,155,593.  Specification of Letters Patent.  Patented Oct. 5, 1915.

Application filed March 3, 1915. Serial No. 11,773.

*To all whom it may concern:*

Be it known that I, ARNOLD WILLIAM MANSBRIDGE, of the city of Winnipeg, in the Province of Manitoba, Canada, have invented certain new and useful Improvements in Electrical Heaters, of which the following is the specification.

The invention relates to improvements in electrical heaters and the object of the invention is to provide an electrical heater which can be used either as a radiator or as a stove, as occasion may arise, the arrangement being such that the change can be quickly made without requiring the removal or the changing of the parts and without impairing the appearance or general efficiency of the device.

A further object of the invention is to construct a heater having the above principal object, which can be manufactured at a relatively small cost and has the parts arranged so that they can be readily assembled and easily repaired if necessary, and such that they will not readily get out of order when in constant use.

With the above objects in view the invention consists essentially in a heater body having an open front and a grid top and fitted with a reflecting lining, a hinged cover to the heater, a movable heating element and means actuated by the opening and closing of the cover for bringing the element into a horizontal position beneath the grid or into a substantially vertical position with the body, the parts being arranged and constructed as hereinafter more particularly described and later pointed out in the appended claims.

Figure 1 represents a front view of the heater. Fig. 2 is a side view of the same. Fig. 3 is an enlarged detailed vertical cross sectional view through the upper portion of the heater with the cover closed. Fig. 4 represents an enlarged detailed sectional view through the heater similar to that shown in Fig. 3, but with the cover open. Fig. 5 is an enlarged detailed vertical sectional view through the heater, the section being taken in the plane denoted by the line X—X' Fig. 3. Fig. 6 is a vertical cross sectional view through the upper portion of the heater showing more or less diagrammatically the position of the working parts at the instant pressure is brought to bear on the heating element to swing the same upwardly into opening of the cover.

In the drawings like characters of reference indicate corresponding parts in each figure.

1 represents a substantially rectangular casing having an open front as indicated at 2, a hood 3 overhanging the latter opening and an open top as shown at 4, there being an inturned marginal flange bounding the top opening as denoted by the reference numeral 5.

The heater is mounted on suitable corner legs 6.

7 is a grid spanning across the opening 4 and having the edges fastened in any suitable way to the flange 5.

The details of construction of the body of the heater are unimportant other than that it have an open front and an open top covered by a grid. The sides and back of the body are lined with a reflecting lining 8, it being noticed that the lining at the ends and toward the top of the heater is inset from the material of the body of the heater as best shown at 8' in Fig. 5 of the drawings. Spacing pieces 9 are provided between these inset portions of the lining and the heater body.

10 represents my heating element which comprises an open centered substantially rectangular frame 11 in which I have inserted an insulating body 12 carrying a wire coil 13 which forms the heating unit, the wire being threaded in the usual way through the body and having the ends terminating in suitably located connecting sleeves 14 and 15 located on the back side of the insulating body.

It is here to be noticed that the ends of the frame extend beyond the ends of the insulating body (see Fig. 5) and form guides 11' and 11$^2$ for a purpose later apparent.

16 and 17 are alined guide pins extending outwardly from the upper corners of the frame. Each of these pins is received slidably within a forwardly and downwardly directed, that is, inclined, slot 18, located in the portions 8' of the lining, with the result that the element is suspended within the heater from the lining.

Spacing rollers 19 and 20 are mounted on the guide pins between the ends of the frame and the lining; these, besides spacing, serve a function later described.

21 is a cover pivotally connected by means of hinges 22 to the heater and arranged to close over the top of the same. This cover carries a reflector 23 which is arranged, when the cover is closed, to lie over the grid. An air space 24 is reserved between this latter reflector and the body of the cover proper.

25 and 26 are a pair of actuating arms having their ends bent in the same direction, more or less at right angles, the outer ends being pivotally connected by means of pivot pins 27 and 28 to the cover, while the inner ends are contracted each to form a shoulder 29 and have their extremities bent inwardly to provide catches 30 and 31. The inner ends of the arms extend within the upper portion of the heater, immediately adjacent the lining at the ends, being admitted through side slots 32 and 33 provided in the flange 5 at the ends of the grid. The arrangement of the arms is such that when the cover is open, as shown in Fig. 4, the heating element is held in a horizontal position by the inturned extremities 30 and 31 of the arms, which it will be noticed pass beneath and engage with the under sides of the guides 11' and 11². The guide pins, in this position of the cover, are at the back ends of the slot 18.

34 and 35 are striking pins extending inwardly from the inner sides of the actuating arms, such pins being arranged, in the open position of the cover, to engage with the flange 5 at the ends of the heater and prevent the said cover from swinging downwardly over the horizontal position, or as shown in Fig. 4 of the drawings. The said striking pins are also designed to engage with the upper surfaces of the guides 11' and 11² when the cover is closed.

At the rear end of each of the slots 32, I have located a rest 36 which really form bearings for the arms 25 and 26 to work on.

37 and 38 are controlling pins extending inwardly within the heater and secured to the portions 8' of the lining. These pins are arranged to engage with the edges of the actuating arms but not with the guides 11' and 11².

39 and 40 are outstanding stop pins carried by the guides 11' and 11², these pins coacting with the shoulders 29 as shortly explained.

41 is an insulating block secured to the back wall of the heater above the back lining. This block carries, in the present instance, a pair of horizontally disposed sleeves 42 and 43 which are extended to support a butting bar 44 of insulating material.

A suitably protected flexible lead wire 45 connects the sleeve 43 with the sleeve 15 and a suitably protected flexible return wire 46 connects the sleeve 14 with that 42.

47 and 48 represent positive and negative feed wires located in the back of the heater behind the lining and connecting the switch 49 with the sleeves 43 and 42. The usual positive and negative main line wires 50 and 51, coming from a suitable source of supply, connect through the switch in the ordinary way with the wires 47 and 48.

With the above wiring it will be seen that the heating element, although movable, is at all times connected with the source of supply through the switch.

When the heater is used as a radiator, the position is as shown in Figs. 3 and 5 of the drawings, wherein it will be seen that the cover is closed and the heating element is in a more or less upright position. The heat actuated from the heating element is deflected by the hood and reflector 23 downwardly to the lower portion of the lining where it is redeflected out through the front opening 2. When the heater is to be used as a stove, the parts appear as shown in Fig. 4 of the drawings, where it will be seen the cover is back and the heating element is in a position immediately beneath the grid. Any article to be heated can be placed directly on the grid. In this way I provide a household electrical appliance which can be used for a double purpose and the advantage of this needs no explanation.

To better understand the operation of the working parts, I wish now to refer to Figs. 3, 4 and 6 of the drawings. In Fig. 3 of the drawings, with the cover closed, it will be seen that the lower edge of the heating element is held back by the action of the striking pins 34 and 35 combined with that of the controlling pins 37 and 38. The pins 37 and 38 prevent the arms from swinging forward as it is obvious, while the pins 34 and 35 hold, in engaging with the guides, the lower edge of the element back with the result that it assumes a position slightly inclined to the vertical. When the cover is raised from the position shown in Fig. 3 to that shown in Fig. 6, there is practically no movement of the heating element other than a slight forward swing into the vertical position. The arms, however, travel up the guides as well as ride over the rests 36. In this way, while the cover is permitted to swing almost a quarter turn, there is practically no movement of the element. However, the instant the parts occupy the position shown in Fig. 6, it will be seen that the arms begin to grasp, so to speak, the element, as the shoulders 29 are engaged with the stop pins 39 and 40 while the inturned extremities, 30 and 31 of the arms, are engaged with the guides. The result of this is that upon the cover being swung backwardly, the lower side of the element is swung forwardly, the arms fulcruming on the rests. The final result of the swinging back of the cover from the position shown in Fig. 6 to that shown in Fig. 4, is, that the guide pins are forced back to the ends of the slots 18 and the element is brought to a horizontal position.

I wish here to point out that during the interval that the arms are moving freely in respect to the element in the initial opening of the cover, that the arms are being swung bodily backwardly to a position in which they engage with the rollers 19 and 20. Consequently any forward sliding of the guide pins in the slot is positively counter-acted, this occurring before the element is grasped, as above referred to, by the arms.

In the closing of the cover, the element drops naturally under the action of gravity and the arms follow, acting under the action of gravity and as controlled by the rests 36 and pins 37 and 38.

What I claim as my invention is;

1. In an electrical heater, a movable normally vertically disposed heating element and means for shifting the element into a horizontal position.

2. In an electrical heater, a movable heating element disposed within the heater normally to radiate heat through the front of the heater and means for shifting the heating element to bring it to a location adjacent the top of the heater.

3. An electrical heater having a movable heating element adaptable, when adjusted, for radiating purposes through the front of the heater or for stove purposes at the top of the heater.

4. An electrical heater constructed normally to serve the purpose of an electric radiator and convertible into an electric stove.

5. The combination with a casing having an open front and top, of a movable heating element contained within the casing and normally designed to radiate heat through the open front of the casing, means normally closing the top of the casing and means for shifting the heating element to a position beneath the open top of the casing.

6. The combination with a casing having an open front and top, of an electrical heating element suspended normally within the casing for radiating purposes through the open front thereof, a cover normally closing the open top of the casing and means, operated by the action of opening the cover, for shifting the heating element to a position beneath the open top.

7. The combination with a casing having an open front and top, of an electrical heating element suspended normally within the casing in a position for radiating purposes through the front of the casing, a pivoted cover normally closing the open top of the casing and means connecting the cover with the heating element whereby the opening of the cover shifts the heating element to a position beneath the open top thereof.

8. The combination with a casing having an open front and top, of an electrical heating element suspended within the casing normally in a position for radiating purposes through the front of the casing, a cover normally closing the opening in the top of the casing and a pair of actuating arms connecting the cover with the element and designed, in the opening of the cover, to shift the element into a position beneath the open top of the casing.

9. The combination with a casing having an open front and top, of a normally, vertically disposed heating element contained within the casing and having the upper end thereof slidably suspended within the casing, a pivoted cover normally closing the open top of the casing, a pair of actuating arms having their upper ends pivotally connected to the cover and their lower ends slidably connected with the element and means for controlling the movement of the arms, in the opening of the cover, to effect the shifting of the element into a horizontal position beneath the open top of the casing in the finally open position of the cover.

10. The combination with a casing having an open front and top, of a normally, vertically disposed heating element contained within the casing toward the back and having the upper end slidably suspended within the casing, a cover pivotally connected to the casing and normally closing the top thereof, a pair of actuating arms extending normally within the casing and having their upper ends pivotally connected to the cover and their lower ends slidably connected with the ends of the element, outstanding stop pins located at the ends of the element and engageable with the actuating arms, controlling pins extending in from the sides of the casing and engageable with the arms, said pins being designed, in the opening and closing of the cover, to control the arms and effect, in the open position of the cover, the bringing of the element into a horizontal position beneath the open top of the casing and in the finally closed position of the cover, the retaining of the arms in a fixed position.

11. The combination with a heater casing having an open top and a grid passing across the opening and secured to the top of the casing, of a cover hinged to the casing and closing over the grid, said cover being formed from connected top and bottom pieces, reserving between them an inclosed air space.

Signed at Winnipeg, this 16th day of January, 1915.

ARNOLD WILLIAM MANSBRIDGE.

In the presence of—
G. S. FOXBURGH,
S. SILVERT.